United States Patent [19]
Kassabgi et al.

[11] Patent Number: 6,003,037
[45] Date of Patent: Dec. 14, 1999

[54] SMART OBJECTS FOR DEVELOPMENT OF OBJECT ORIENTED SOFTWARE

[75] Inventors: George Kassabgi, Peabody, Mass.; John R. Sadd, Nashua, N.H.; William T. Wood, Boxborough, Mass.

[73] Assignee: Progress Software Corporation, Bedford, Mass.

[21] Appl. No.: 08/739,329

[22] Filed: Oct. 30, 1996

Related U.S. Application Data

[60] Provisional application No. 60/006,740, Nov. 14, 1995.

[51] Int. Cl.⁶ ........................................... G06F 17/30
[52] U.S. Cl. ..................... 707/103; 395/701; 395/703; 395/683
[58] Field of Search ........................ 345/352, 326, 345/334, 440; 395/701, 705, 704; 707/2, 1, 103, 6; 371/20.1

[56] References Cited

U.S. PATENT DOCUMENTS

| | | | |
|---|---|---|---|
| 4,894,829 | 1/1990 | Monie et al. | 371/20.1 |
| 5,119,475 | 6/1992 | Smith et al. | 345/353 |
| 5,212,787 | 5/1993 | Baker et al. | 707/101 |
| 5,257,349 | 10/1993 | Alexander | 345/334 |
| 5,287,447 | 2/1994 | Miller et al. | 345/342 |
| 5,325,533 | 6/1994 | McInerney et al. | 395/701 |
| 5,339,433 | 8/1994 | Frid-Nielsen | 395/705 |
| 5,361,350 | 11/1994 | Conner et al. | 707/103 |
| 5,361,351 | 11/1994 | Lenkov et al. | 395/704 |
| 5,369,570 | 11/1994 | Parad | 705/8 |
| 5,379,430 | 1/1995 | Nguyen | 705/3 |
| 5,379,432 | 1/1995 | Orton et al. | 395/683 |
| 5,396,626 | 3/1995 | Nguyen | 395/701 |
| 5,412,774 | 5/1995 | Agrawal et al. | 345/340 |
| 5,416,895 | 5/1995 | Anderson et al. | 707/503 |
| 5,428,740 | 6/1995 | Wood | 345/440 |
| 5,428,744 | 6/1995 | Webb et al. | 345/524 |
| 5,446,891 | 8/1995 | Kaplan et al. | 707/2 |
| 5,455,599 | 10/1995 | Cabral et al. | 345/133 |
| 5,463,724 | 10/1995 | Anderson et al. | 707/503 |
| 5,517,606 | 5/1996 | Matheny et al. | 345/352 |
| 5,608,909 | 3/1997 | Atkinson et al. | 395/703 |
| 5,657,460 | 8/1997 | Egan et al. | 345/326 |
| 5,682,535 | 10/1997 | Knudsen | 395/701 |
| 5,692,129 | 11/1997 | Sonderegger et al. | 707/10 |
| 5,740,440 | 4/1998 | West | 395/704 |
| 5,778,378 | 7/1998 | Rubin | 707/103 |
| 5,787,425 | 7/1998 | Bigus | 707/6 |
| 5,790,855 | 8/1998 | Faustini | 395/701 |

Primary Examiner—Thomas G. Black
Assistant Examiner—Charles L. Rones
Attorney, Agent, or Firm—Weingarten, Schurgin, Gagnebin & Hayes LLP

[57] ABSTRACT

An improved object-oriented programming environment for facilitating creation of database management applications is disclosed. The programming environment provides a method and apparatus for establishing named connections between encapsulated, individually designed software components referred to as "smart objects," which communicate and act in a coordinated fashion as part of a finished software application. Connections between smart objects are referred to as "smart links." A basic set of smart links for coordinating a core group of smart objects is disclosed, and a substantial variety of database management applications can be created using the disclosed smart objects and smart containers. The core group of smart objects each include four common capabilities: the capability to initialize and destroy themselves, the capability to get and set attributes, the capability to add and remove smart links, and the capability to communicate using a standard communication interface. Individual smart objects have other capabilities in addition to the four common capabilities.

20 Claims, 11 Drawing Sheets

Container Link

Record Link

Navigation Link

TableIO Link

State Link

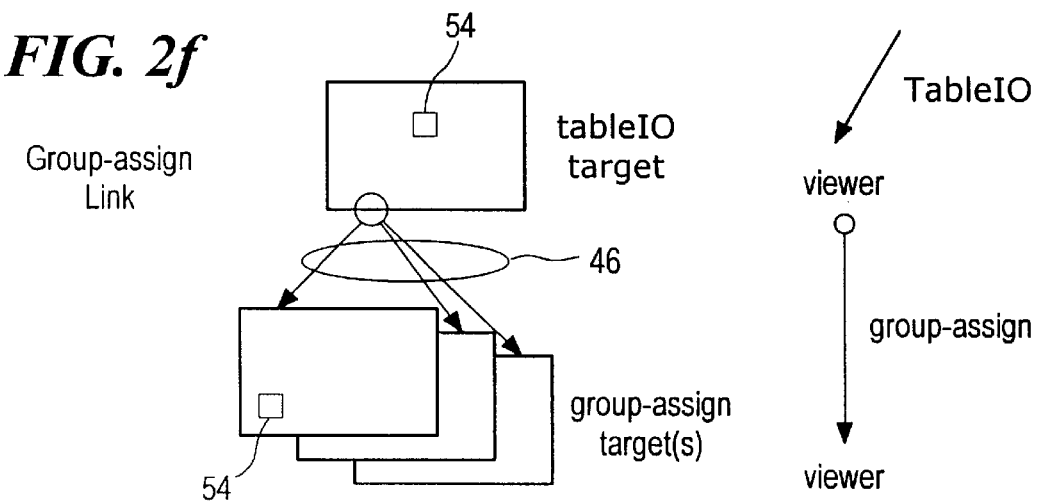
FIG. 2f
Group-assign Link
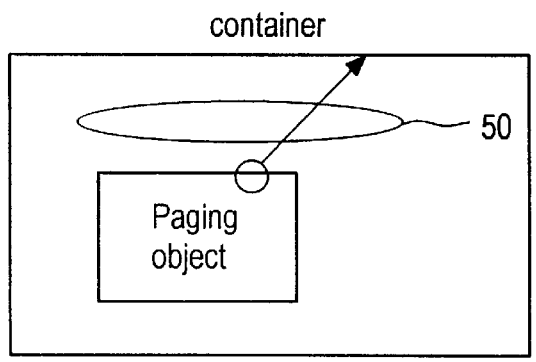
FIG. 2g
Page Link
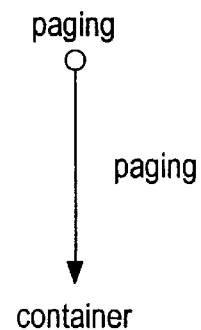

SMART OBJECTS FOR DEVELOPMENT OF OBJECT ORIENTED SOFTWARE

CROSS-REFERENCE TO RELATED APPLICATION

A claim of priority is made to provisional patent application Ser. No. 60/006,740, entitled Smart Objects For Development Of Object Oriented Software, filed Nov. 14, 1995.

FIELD OF THE INVENTION

The present invention is generally related to software development, and more particularly to development of object oriented database management applications.

BACKGROUND OF THE INVENTION

Database management applications using relational and object oriented models are used to facilitate storage, maintenance and retrieval of information. Since databases are utilized by a wide variety of end-users in different industries, and for a variety of different purposes, individualized management applications are employed to suit the particular needs of each end-user. Development of such individualized management applications requires appreciable programming skill, and a relatively large proportion of the cost of creating and maintaining a database can be attributed to the difficulties of developing an appropriate database management application. It would therefore be desirable to provide a development environment which would make database management application development less difficult.

SUMMARY OF THE INVENTION

An improved object-oriented programming environment for creating database management applications is disclosed. The programming environment provides a method and apparatus for establishing named connections between encapsulated, individually designed software components referred to as "smart objects." The connections, which are referred to as "smart links," allow the smart objects to communicate and act in a coordinated fashion as part of a finished software application. A basic set of smart links for coordinating a core group of smart objects which provide tools to build a substantial variety of database management applications is disclosed.

The core group of smart objects each include four common capabilities: the capability to initialize and destroy themselves, the capability to get and set attributes, the capability to add and remove smart links, and the capability to communicate using a standard communication interface. Individual smart objects have other capabilities in addition to the four common capabilities. The core group of smart objects includes a container object, a navigation object, a tableIO object, a paging object, a query object, a viewer object, and a browser object. The query object provides a source for database records. The browser object provides presentation of tabular data in rows and columns. The viewer object views a single row of data. The navigation object provides a source for messages of a navigational nature, i.e., messages such as "Next record" and "Previous record." The tableIO object provides a source for record manipulation messages, i.e., messages such as "Save," "Update," "Undo changes," and "Delete." The paging object controls the visualization of unique pages of objects. The container object provides containment of other objects for grouping and encapsulation.

BRIEF DESCRIPTION OF THE DRAWING

Other features and advantages of the present invention will become apparent in light of the following detailed description of the drawing in which:

FIGS. 2a–2g are block diagrams of associations between the smart objects and the smart links;

DETAILED DESCRIPTION OF THE DRAWING

Figure 1:
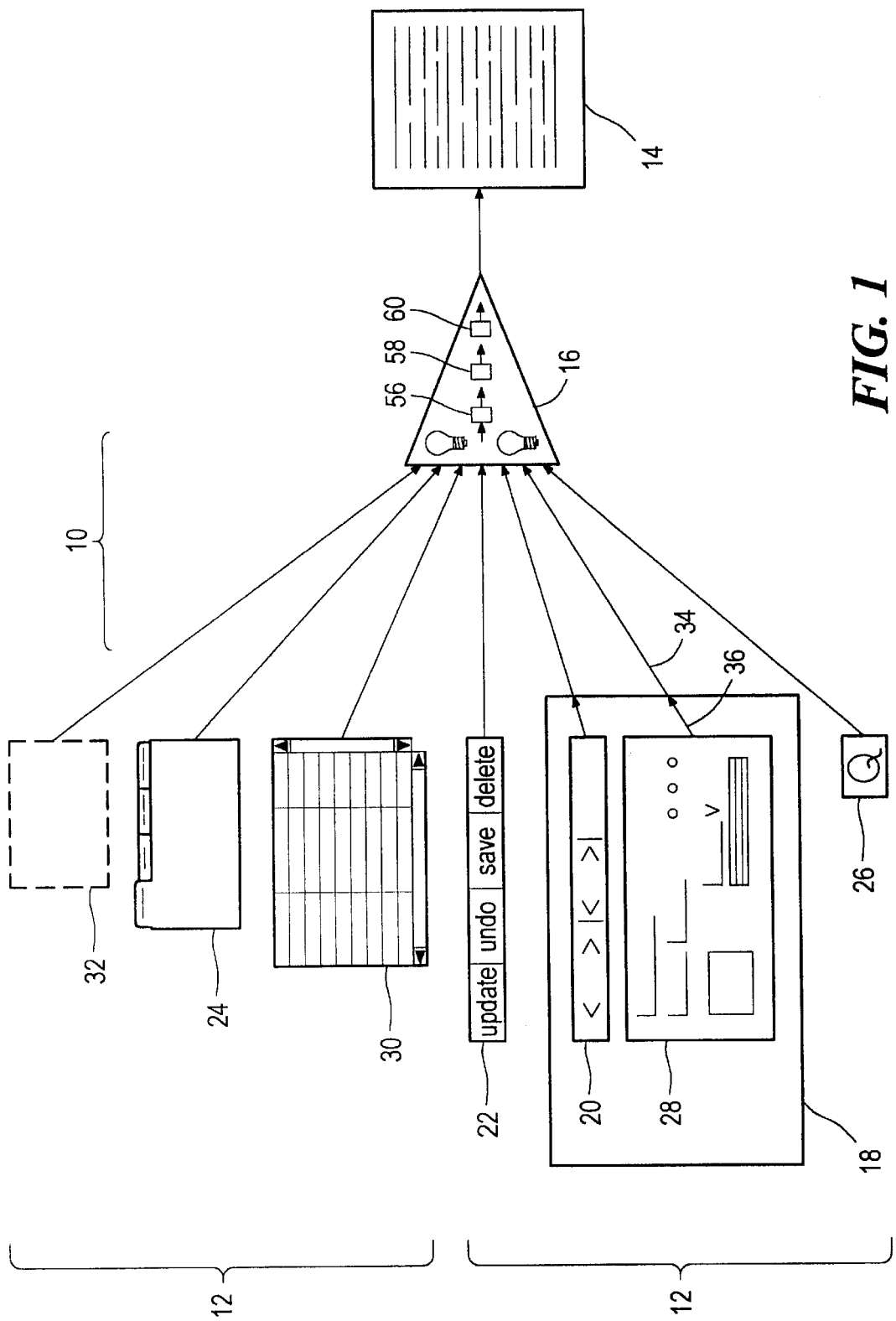
FIG. 1 is a block diagram of an improved object-oriented programming environment for creating database management applications.
Figure 2A:
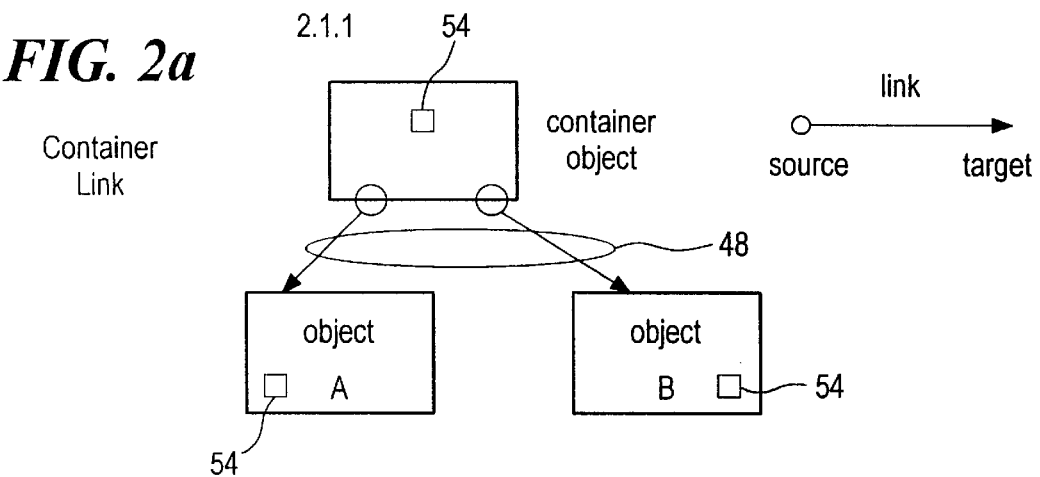
Figure 2B:
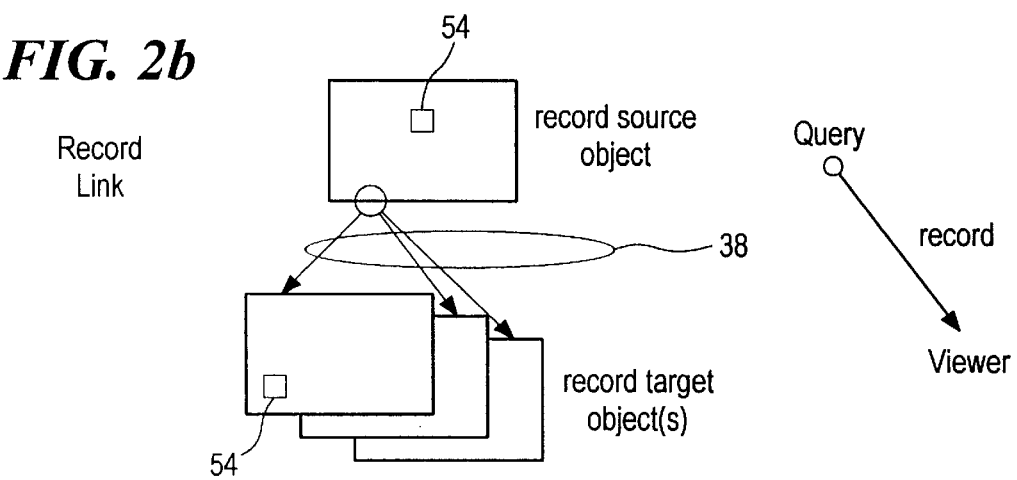
Figure 2C:
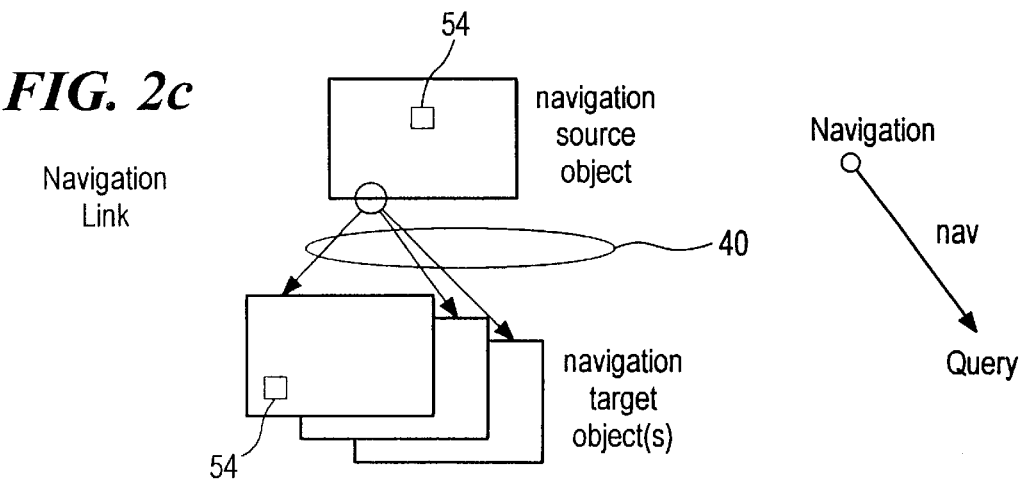
Figure 2D:
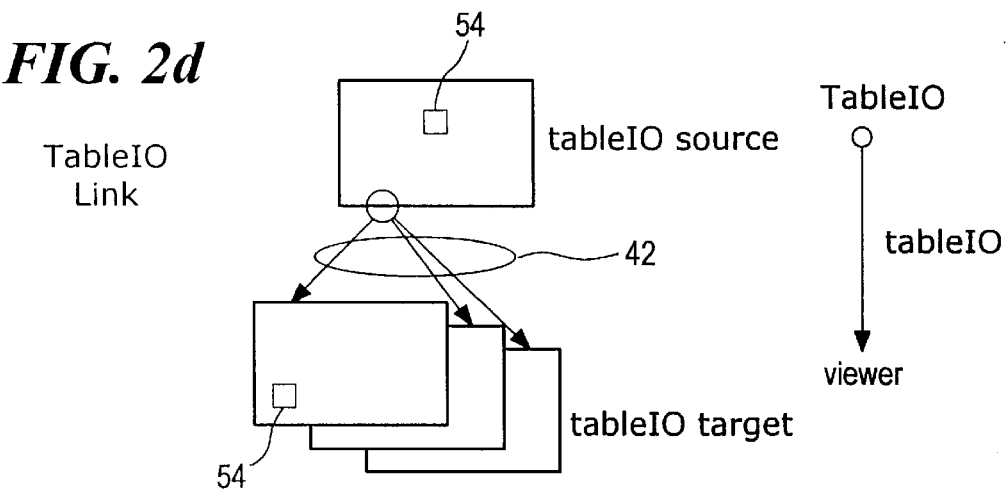
Figure 2E:
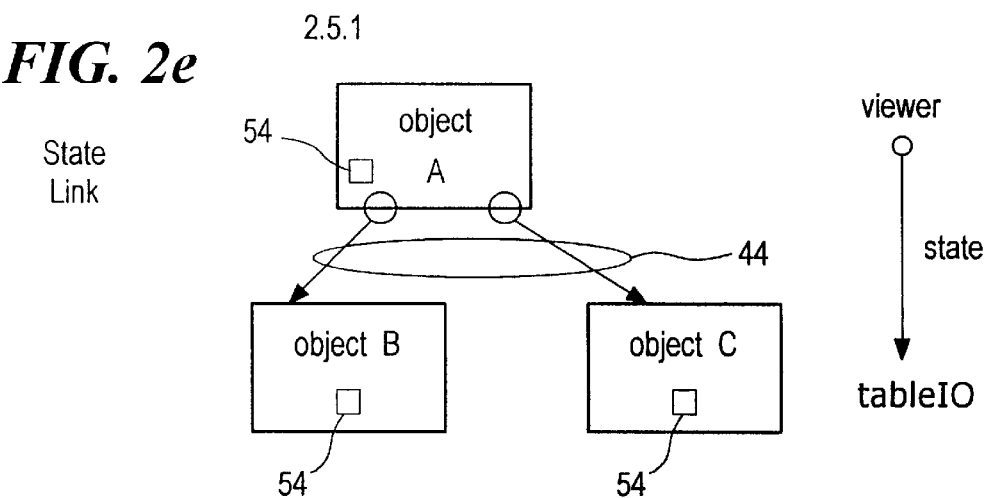

FIG. 1 illustrates an improved object-oriented programming environment for creating database management applications. The programming environment provides a method and apparatus for establishing named connections, referred to as "smart links," between encapsulated, individually designed software components referred to as "smart objects." The smart links 10 allow the smart objects 12 to communicate and act in a coordinated fashion as part of a finished software application 14. A set of smart links sufficient for coordinating a core group of smart objects 12 for building a substantial variety of database management applications 14 is included in the programming environment.

The programming environment includes a user interface builder 16 which is employed to assemble smart objects in order to provide the database management application. The core group of smart objects includes a container object 18, a navigation object 20, a tableIO object 22, a paging object 24, a query object 26, a viewer object 28, a browser object 30 and a user defined object 32. Each smart object is an encapsulated procedure with particular capabilities. All smart objects have four common capabilities: the capability to initialize and destroy themselves, the capability to get and set attributes, the capability to add and remove smart links, and the capability to communicate using a standard communication interface. Individual smart objects have other capabilities in addition to the four common capabilities. The query object 26 provides a source for database records. The viewer object 28 provides presentation of a single row, or view, of data. The browser object 30 provides presentation of tabular data in rows and columns. The navigation object 20 provides a source for messages of a navigational nature, i.e., messages such as "Next record" and "Previous record." The tableIO object 22 provides a source for record manipulation messages, i.e., messages such as "Save," "Update," "Undo changes," and "Delete." The paging object 24 provides control of the unique pages, or collections, of objects. The container object 18 provides containment of other objects for grouping and encapsulation A set of smart objects can be encapsulated as a group in the container object 18. The container grouping normally corresponds to a container visualization such as a Frame, Dialog Box, or Window, but can also be a strictly logical grouping. The container can then be used as a single object in another parent object. When the container is used in this manner, links can be established between the container and the parent. At runtime, a first link 34 from a SOURCE outside of the container and a second link 36 of the same type from the container to an object within it are merged automatically into a single link, thereby allowing the true SOURCE and TARGET for the set of behaviors defined by the link to communicate directly and transparently with each other without violating the integrity of the container as a logical object at the time the application components are assembled.

Other smart objects can be created from a combination of the predefined smart objects. For example, the container object 48 and the browser object 30 can be combined into a newly defined class of object which encompasses the capabilities and behavior of both of the parent objects. The newly defined objects can then be used with the predefined smart objects. User defined smart objects can be created using one of the predefined smart objects as a base or by using a newly defined and described smart object template.

Referring now to FIGS. 1, 2a–2g, the smart objects communicate and exchange data using the smart links 10. Various types of predefined smart links are provided within the programming environment, including a record link 38, a navigation link 40, a tableIO link 42, a state link 44, a group-assign link 46, a container link 48, and a page link 50. The record link 38 provides for the exchange of record pointers. The navigation link 40 is used for messages involving record positioning, i.e., record positioning messages such as "Next," "Previous," and "Last." The tableIO link 42 is used for messages involving record manipulation, i.e., messages such as "Save," "Update," and "Delete." The state link 44 is used for transmission of object state information. The group-assign link 46 is used for synchronization of messages among multiple related objects. The container link 48 is used for messages involving object containment, i.e., messages such as "Hide" and "View." The page link 50 is used for management of multiple visual pages within the user interface. A pageN link can be used for management of messages to objects within a visual page with an interface. Other smart links can be created by modifying one of the predefined smart links.

Smart links can also be created using developer defined attributes. For example, a developer can define a STATE link between two objects and pass any state messages by name across that link:

```
RUN add-link (THIS-PROCEDURE, 'STATE', other-procedure-
handle)
/* This will be sent across the STATE link to other-
procedure: */ RUN new-state ('buttons-initialized, STATE-
TARGET')
```

As with event names, an extensible mapping of common state messages to the default links across which they should normally be sent allows the link type to be omitted in the writing of application logic, as: RUN new-state ('no-record-available').

Each of the smart objects in the core group includes as part of its definition a list 54 of the set of named link types which can connect it to other smart objects. New object types created by application designers have their own list of supported link types. New link types can also be defined as part of the design of new object types and the extension of smart object functionality.

Each named link type carries with it an expectation of supported standard behavior on each end of the link. This allows the link to define the nature of the relationship between the objects, and to allow them to operate in a coordinated fashion. This behavior, in the form of event procedures, defines the relationship between the objects by representing specific procedural behavior invoked over the link. In addition, state messages can be sent between objects to inform objects of changes in the execution state of a particular object without assuming any particular behavior to be executed as a result of that state change. These named states can also be sent to objects over particular named links, or across a STATE link designed expressly for that purpose.

All links are stored in a single data table in a support procedure called an "ADM Broker" which executes on behalf of an application client process. Each link record holds a handle to the SOURCE object, a handle of the TARGET object, the name of the link, and a flag indicating whether the link is currently active or inactive. Each link type has an attribute which indicates whether that link should remain active when the objects on either end of the link are not visible to the application user. If this attribute is set to TRUE, then the link will be deactivated whenever at least one of the objects on the end of the link is hidden, and activated when both objects are viewed. This default behavior can also be customized for a particular application. When a link is inactive, no events or state messages are able to traverse the link. This allows an application to set up multiple links of the same type from a single SOURCE object to multiple TARGET objects with only one of those links being active at any given time during application execution. All processing of links, in addition to notify and new-state methods which use the links, are coordinated by the Broker procedure using a unified link table.

The "notify" method procedure allows developer-written application code to invoke event procedures in other objects connected by the named links without requiring developer knowledge of which objects, or even which type of objects, will be connected in a particular application situation. The developer simply specifies the type of link across which an event is to be dispatched, as: RUN notify 'open-query, RECORD-SOURCE.' This specification dictates that the open-query event procedure is to be invoked in any object connected to the present object as its RECORD-SOURCE.

A mapping of common event procedures to the link types across which such procedures are normally sent is built into the application execution mechanism. This mapping can be extended or modified for the purposes of any particular software application, and hence allows the developer to omit the link name when dispatching events in other objects, as: RUN notify 'row-available.' This command dictates that the row-available event is to be invoked in any object connected to the present object by any of the links named in the event mapping.

Referring now to FIGS. 1 and 2a–2g, the user interface builder 16 creates the application 14 from the smart objects 12 and smart links 10. More particularly, the information required to create the application is derived, at least in part, from associations between the smart objects and the smart links. Messages flow from "source" objects to "target" objects until the last target is reached in the hierarchy of objects in an interface or program. Message flow defines the typical direction of event and method invocation, however, events and methods can be invoked in either direction. The association of a target and a source with a link type, for example: Navigation-Source, describes a correspondence between the smart object and another object, including the ability of the smart object to receive and transmit the message. Hence, Navigation-Source implies a smart object such as Navigation Panel which incorporates procedures for transmitting navigation messages across navigation links.

Any smart object may be a target, source or both target and source for any link, provided respective procedures for targeting, sourcing or targeting and sourcing the link are present within the object. For example, an object may have a plurality of sources of different link types simultaneously, provided the sources support the appropriate targeting procedures. However, an object may have only one source of any given link type. Exemplary groupings are shown in FIGS. 2a–2g. A Record link 38 can connect any record source object, e.g., Query, Browser, with any record target objects, e.g., Viewer. A Navigation link 40 can connect any navigation source object, e.g., Navigation, Panel, with any navigation target object, e.g., Viewer, Browser. A TableIO link 42 can connect any tableIO source, e.g., TableIO Panel, with any tableIO target, e.g., Viewer. A State link 44 can connect any smart object, e.g., Viewer with any smart object, e.g., Query. A Group-assign link 46 can connect any tableIO target, e.g., Viewer, with any group assign target, e.g., Viewer. A Container link 48 can connect any container object, e.g., Window or Frame, with any object it has created, with or without visual representation, e.g., Viewer. Finally, a Page link 50 can connect any paging object, e.g., Folder, with any smart Container, e.g., Smart Window.

A grouping or other combination of smart objects can be treated as a single smart object entity. Any smart objects placed within a container object can transmit and receive messages through the container object transparently using a pass-through link. In such a case, smart objects can be grouped together visually, within a common container, while maintaining an absolute degree of independence relevant to object messaging.

Referring again to FIG. 1, the user interface builder 16 performs several steps to provide the database management application 14 from the smart objects and smart links. The steps include creating 56 instances of objects, checking 58 each object to ensure that the object is valid, and querying 60 each object as to how that object should be linked to other objects. The user interface builder also facilitates determination of how each object's attributes should be initialized, and automatically creates an underlying structure to recreate the object and its operational behavior prior to compiling.

Figure 3:
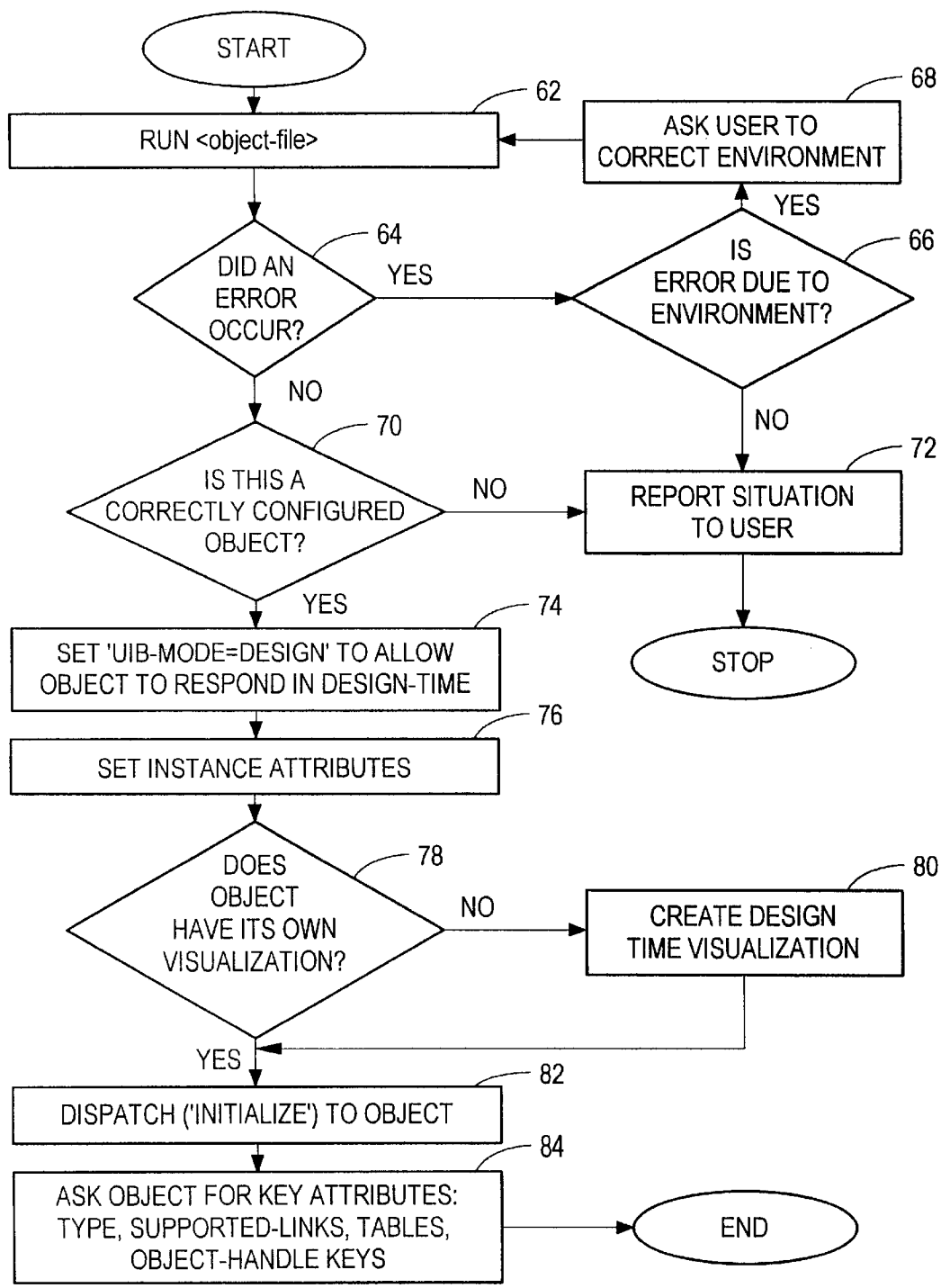
FIG. 3 is a flow chart of the method employed by the user interface builder to create and query each object.

FIG. 3 shows the methods employed by the user interface builder to create and query each object. In step 62 the name of the object's master file, <object-file>, is obtained and the object is run. The name is obtained from the developer if a new instance of the object is being created. The name is obtained from the system clipboard if a cutting and pasting operation is being used to create the object. Alternatively, the name is obtained from a disk if the developer is opening a file containing the object. A determination is then made in step 64 as to whether an error occurred during the run step. If an error did occur, a determination is made as to whether the error was attributable to the environment in step 66. Errors which are attributable to the environment may be corrected by the developer in step 68. After correcting such an error, flow returns to the run step 62. If the error is not attributable to the environment a report is made to the developer in step 72.

If no error is detected in step 64, an additional determination is made that the object is valid in step 70. A series of checks are performed to assure that the object can be linked into the SmartObject environment. If the object is not correctly configured then a report is made to the developer in step 72. If the object is correctly configured, the interface builder sets an attribute in the object: "UIB-Mode=Design" in step 74. Step 74 allows the object to self-establish behavior and visualization within the interface builder when the object self-initializes. A list of settings and attributes which distinguish the instance from any other instance is then sent to the object in step 76. The list will generally be empty for new instances, but may contain some attribute/value pairs in other cases. A determination is then made as to whether the object has a visualization in step 78. The user interface builder is a visual development environment and, as such, requires that all objects have a visualization (for example, the SmartQuery object is pure logic and has no intrinsic visualization). If the object does not have a visualization, the interface builder creates a visual representation of the object in step 80. The object is then 'auto-initialized' in step 82 by finishing its creation and visualizing itself, if appropriate. At this point the object generally responds to the 'UIB-Mode=design' attribute set above. Finally, in step 84, the interface builder queries the object for instructions which indicate how the object is to be linked into the final application. This step involves probing the object for the links which the object supports and the database tables and foreign keys that the object needs or can supply.

Figure 4:
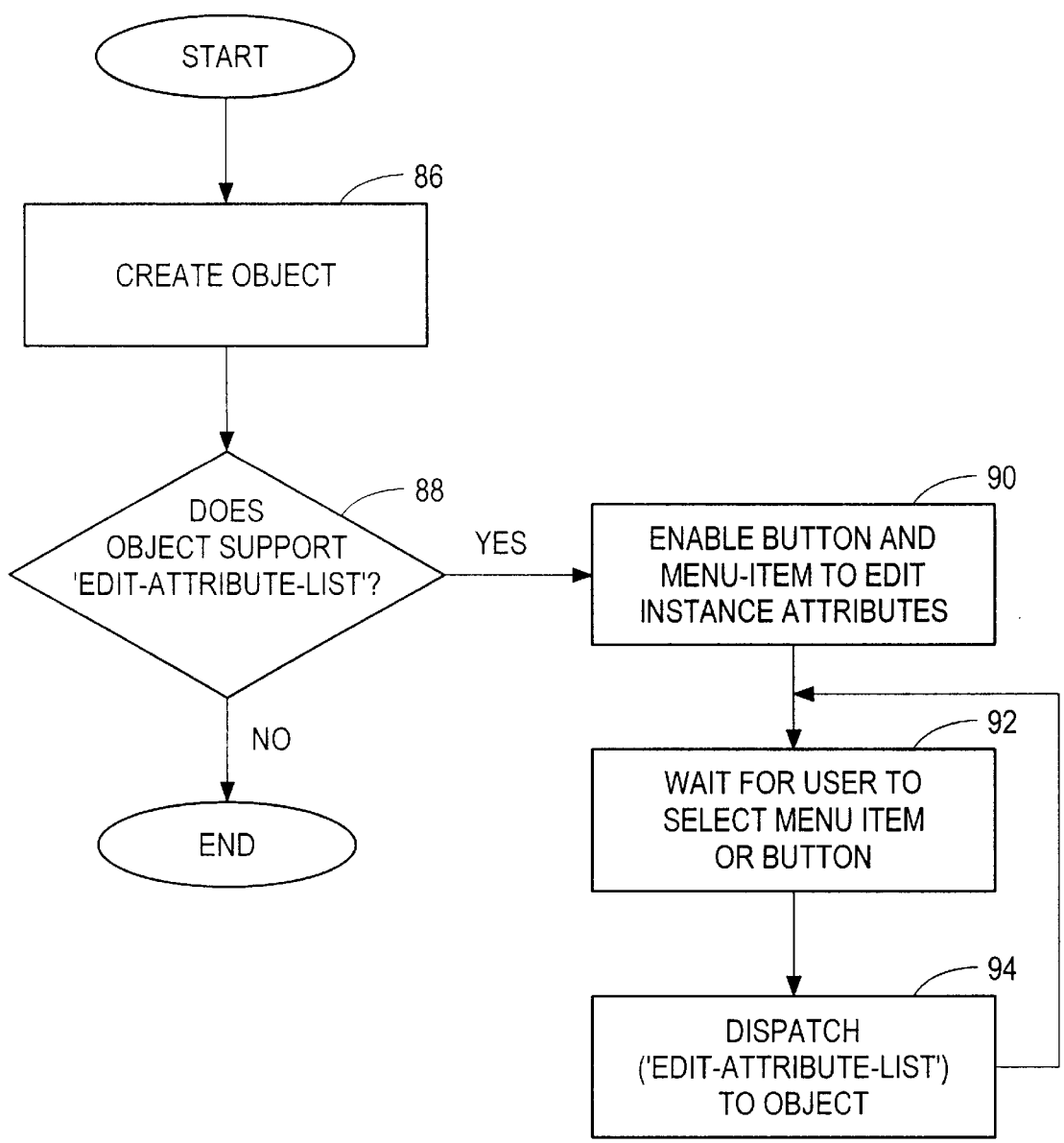
FIG. 4 is a flow chart of the method for maintenance of a list of attributes and settings by objects.

FIG. 4 illustrates object maintenance of a list of attributes and settings. Objects are created in step 86, as described above, and can be drawn, copied, or opened from a file. When an object is created, that object is queried in step 88 to determine whether the object supports a special event named "edit-attribute-list." If the object does not support "edit-attribute-list," flow ends. If the object does support "edit-attribute-list," then the user interface builder enables buttons and menu items that give the developer access to event in step 90. In this way, only objects that can support instance attributes show these capabilities to the developer using the object. The user interface builder then waits 92 for the developer to select a button or menu item. When the developer selects a button or menu item, the user interface builder dispatches the "edit-attribute-list" event to the object in step 94. The object then responds according to the object's internal configuration. Generally speaking, the object will bring up a dialog-box allowing the user to change attribute settings. Objects also have a self-reconfiguration function which based on how the settings are changed. The user interface builder does not directly store new attribute settings. When the user interface builder is ready to store the values to a disk file, it will query the object for this list.

Figure 5:
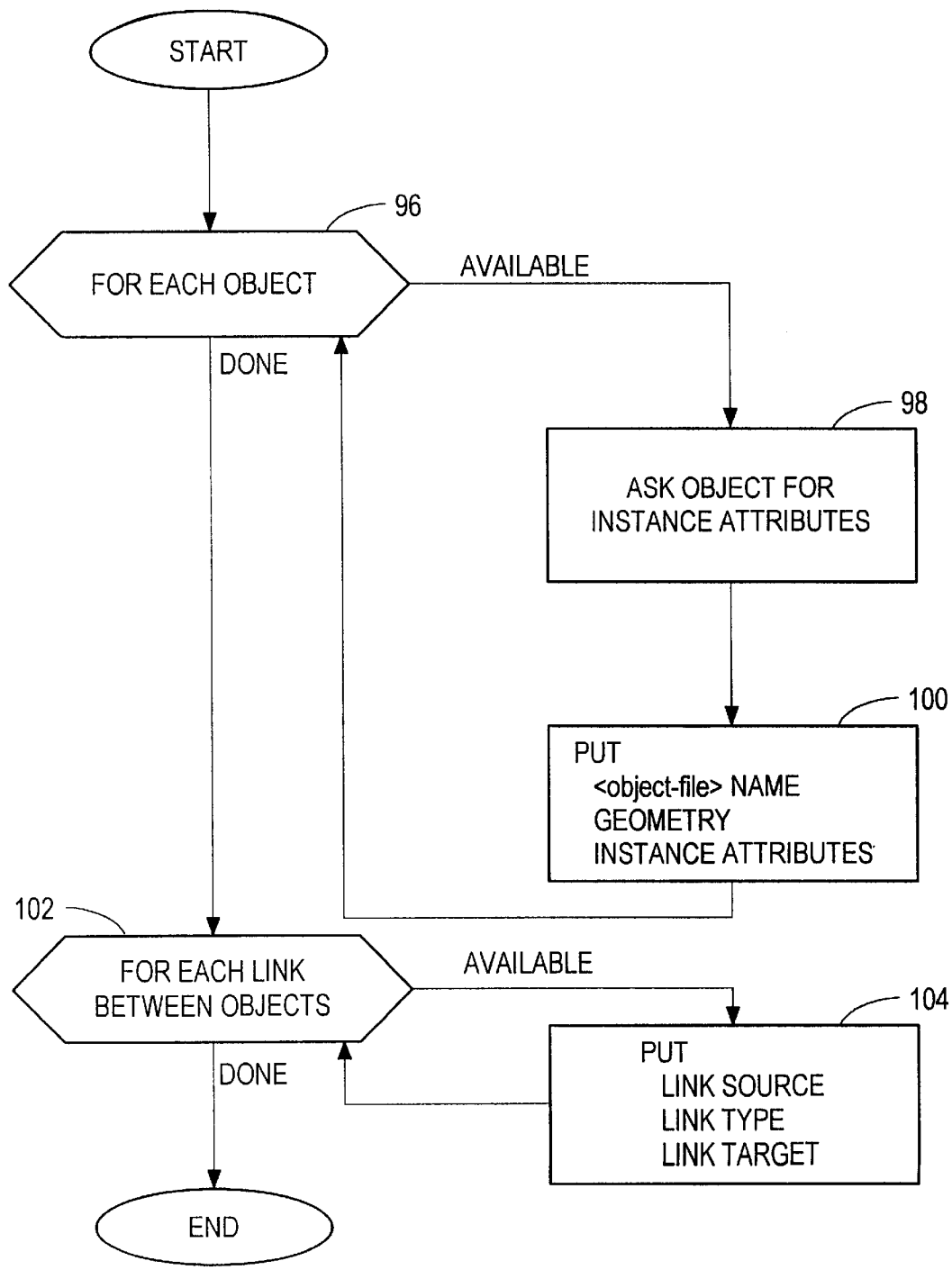
FIG. 5 is a flow chart of the user interface builder method for writing a file containing the structure of a smart object application.

FIG. 5 shows the method for writing a file containing the structure of a smart object application. Each object in the interface is first queried 98 for the list of "instance attributes" that the object requires to recreate itself in a running application. This list can be as long or as short as necessary. As described above, the list is provided by the object itself. This list, as well as the name of the object master file, <object-file>, and the geometry of the object are written to the output file in step 100. Steps 98 and 100 are executed for each object in the interface by cycling 96 through each object. When each object has been queried, each link is written to the file in step 104 by cycling through the links in step 102.

Figure 6:
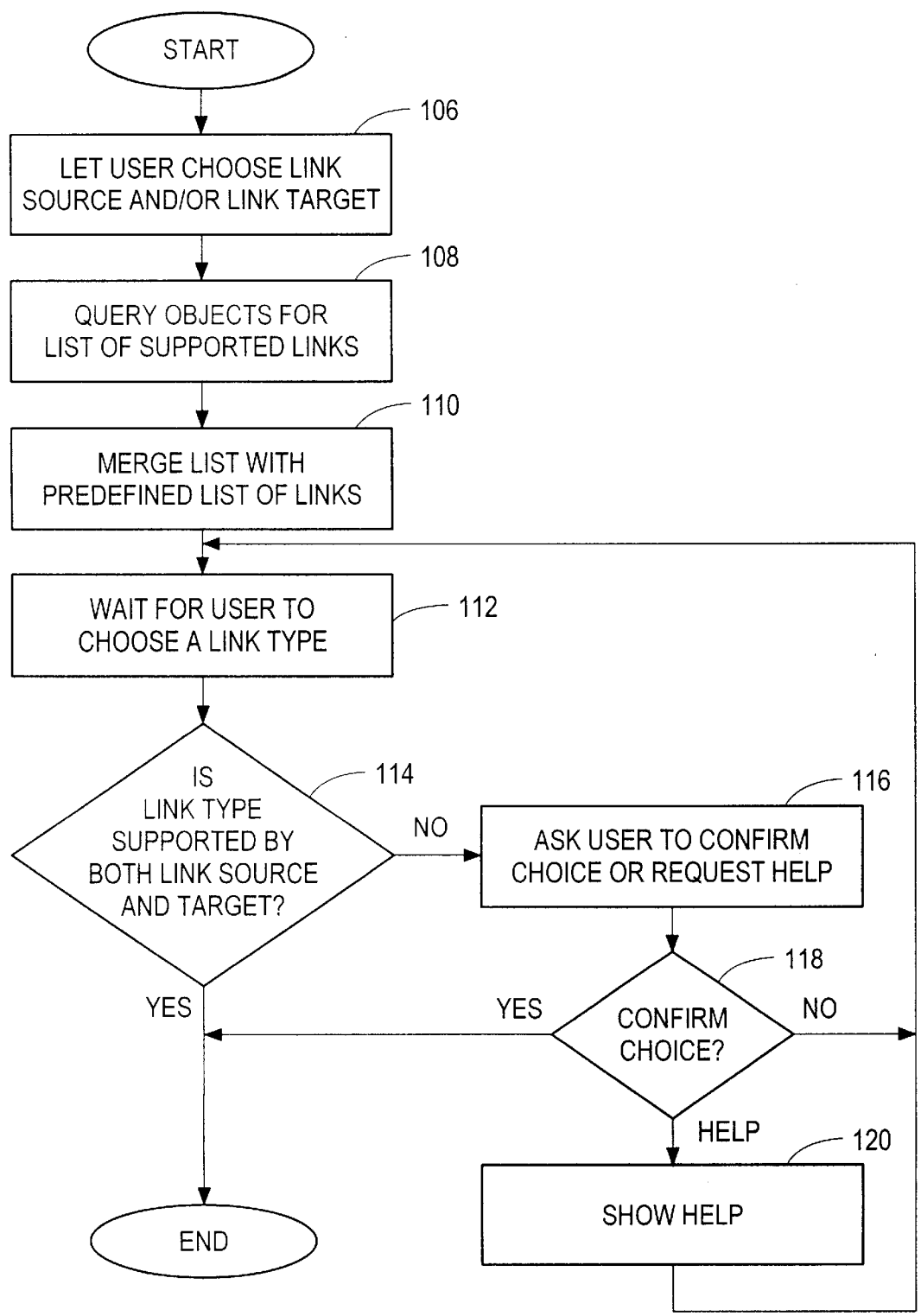
FIG. 6 is a flow chart of the user interface builder method for adding a new link.

FIG. 6 shows the method for adding a new link. The developer begins the linking process by choosing 106 the link source or link target. The object is then queried 108 for the object's list of supported links, and the list of "supported-links" is retrieved 110 directly from the object. The retrieved list is merged with a predefined list of link types that are assumed to be supported. The developer can also select from the merged list or enter a new link name in step 112, following which both the link source and link target are queried 114 to make sure that the chosen link type is supported. If the chosen link type is supported, the link is successfully added. If the chosen link type is not supported, e.g., in the event of an unexpected link type, the user is asked 116 to confirm the choice. If the choice is confirmed then the link is added. If the choice is not confirmed, flow returns to step 112. Alternatively, if the developer is unsure of what to do, link related help is available in step 120.

Figure 7:
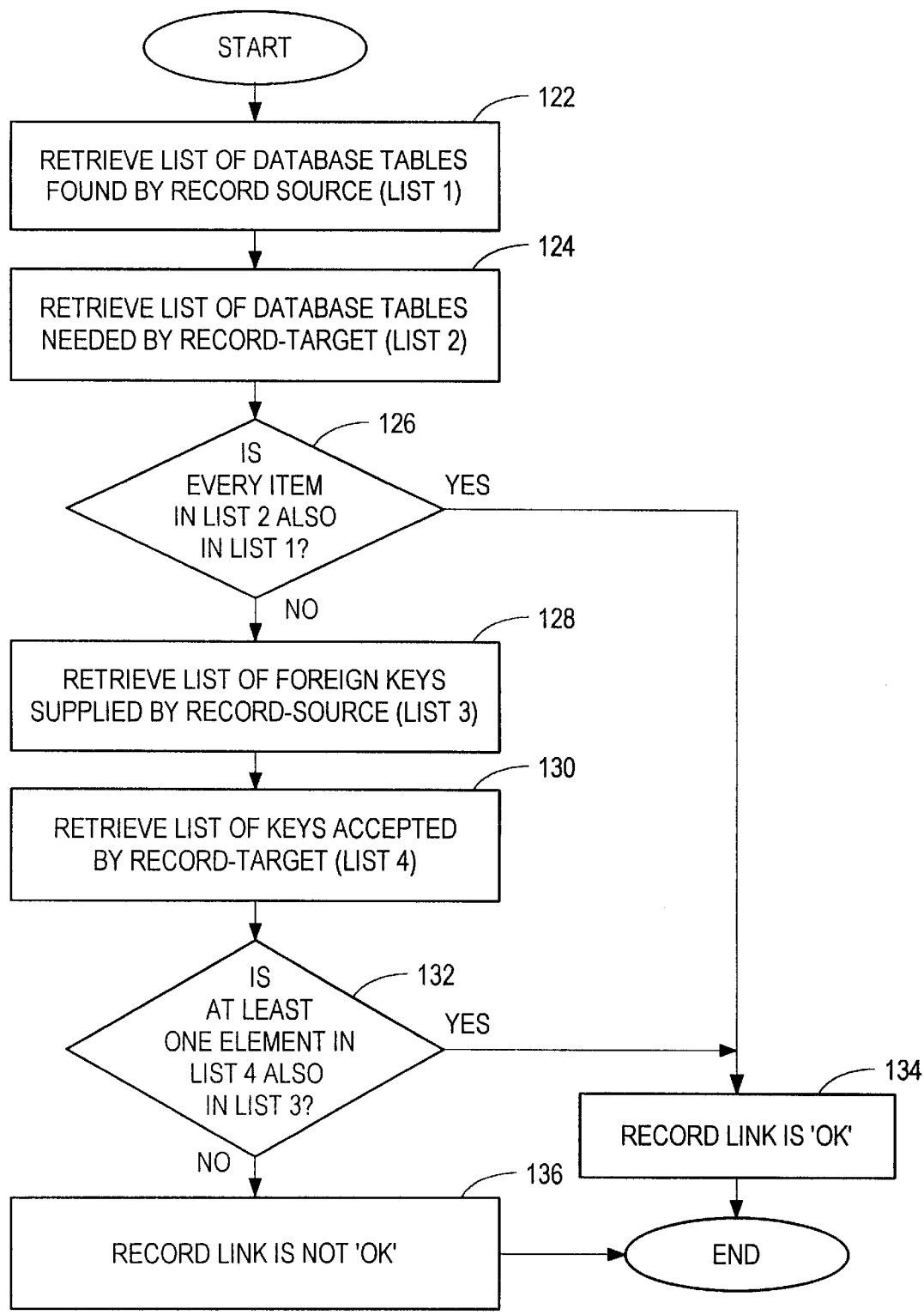
FIG. 7 is a flow chart of the additional steps followed by the user interface to validate a Record-Link.

FIG. 7 shows the method followed by the user interface to validate a Record-Link. The Record-Source and Record-Target are queried in steps 122 and 124, respectively, for a list of the tables which are supplied and required. In step 126 the lists are compared. If all the tables required by the Record-Target can be supplied by the Record-Source, then a Record link is determined 134 to be 'OK.' Otherwise, additional tests are made. In steps 128 and 130 the Record-Source and Record-Target are queried, respectively, for a list of foreign keys that can be supplied or accepted. In step 132 a comparison is made between the lists generated in steps 128 and 130. If there is at least one set of keys that are acceptable by the Record-Target that can also be supplied by the Record-Source, then a Record line is possible.

Otherwise, the Record Link is determined 136 to be impossible.

Referring again to FIG. 1, the user interface builder includes two advisors which facilitate application development. The first advisor is a "Link Advisor." The Link Advisor is activated when a new instance of a smart object is created, and functions to determine whether the new object includes Supported-Links which should be filled. The second advisor is a "Run Advisor." The Run Advisor is activated when the developer executes a test of the application under development.

Figure 8:
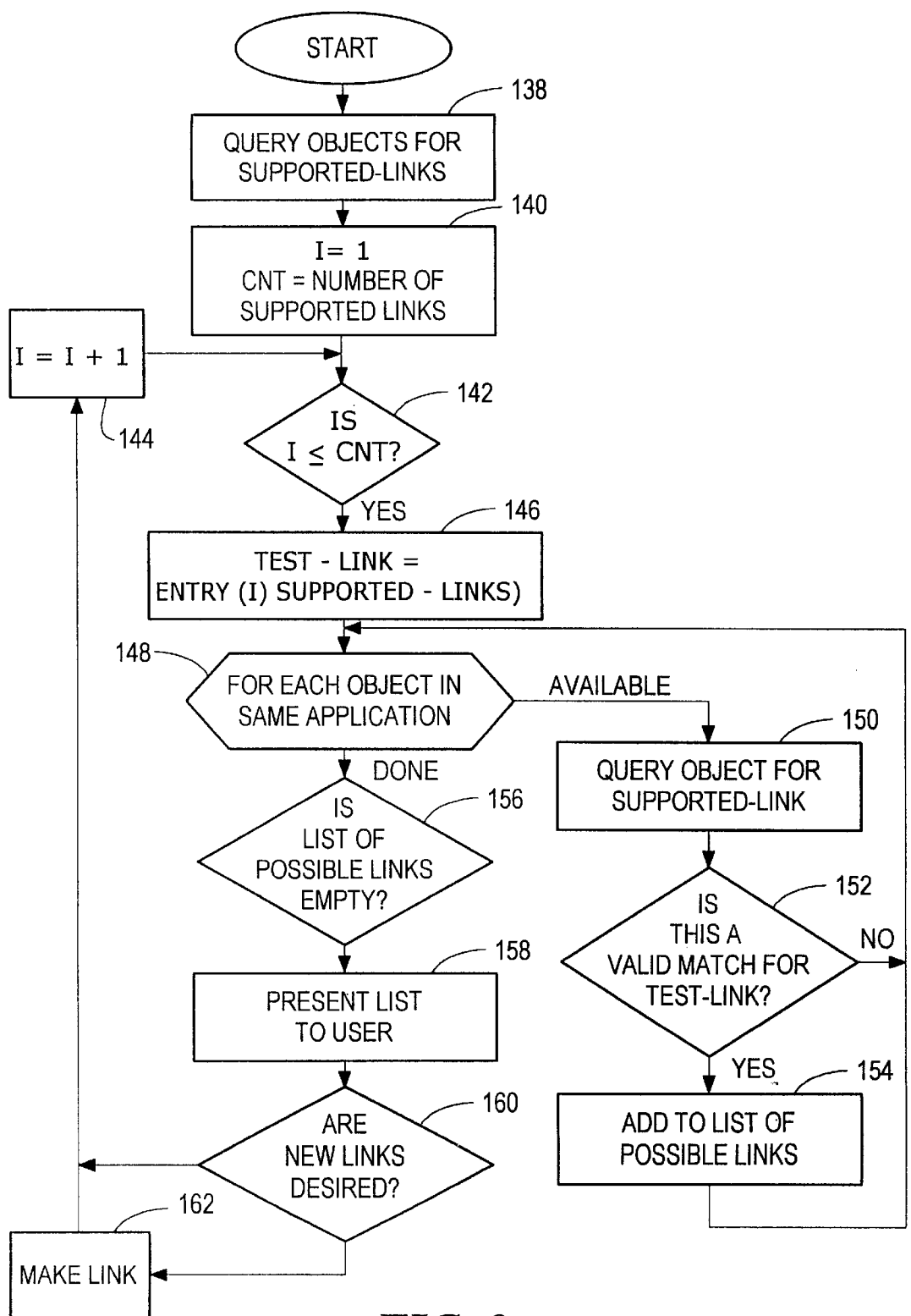
FIGS. 8–9 are flow charts of builder environment query methods.

The method employed by the Link Advisor operation is illustrated in FIG. 8. In step 138 the new object is queried for the list of 'supported-links.' The list of supported links is an attribute possessed by all smart objects. Each item in the list is tested. For example, if an object supports two links, 'TableIO-Target, Record-Target,' then the algorithm first sets Test-Link to TableIO-Target, and then to Record-Target. In step 140 a variable I is set to 1 and a variable CNT is set to the number of supported links. In step 142, I and CNT are compared, and if I is less than or equal to CNT then Test-Link is set to Entry(I, Supported-Links) in step 146. Each of the other objects in the same application are similarly examined in step 148, and the list of Support-Links for those objects are queried 150. The list of Supported-Links for these other objects are then tested 152 against the Test-Link. The Supported-Links must contain the other end of the Test-Link. That is, if Test-Link is 'Record-Target,' then Supported-Links must contain 'Record-Source.' In the case of Record links, an additional test to confirm table matching is also performed. Finally, pre-existing links are checked. If the object already has a link of the test type and if the link is not a many-to-one link, then it is skipped over. If an object can match the Test-Link, then it is added 154 to a list of possible links. This list will be presented to the developer when all objects have been checked. Once all the objects have been checked, the list of possible links is tested 156 And presented 158 to the developer, provided at least one possible link has been found in the testing step. The developer can then choose 160 a link from the generated list of possible links. The developer may also elect not to make a link. If the developer chooses a new link from the list, the link is officially added 162.

Figure 9:
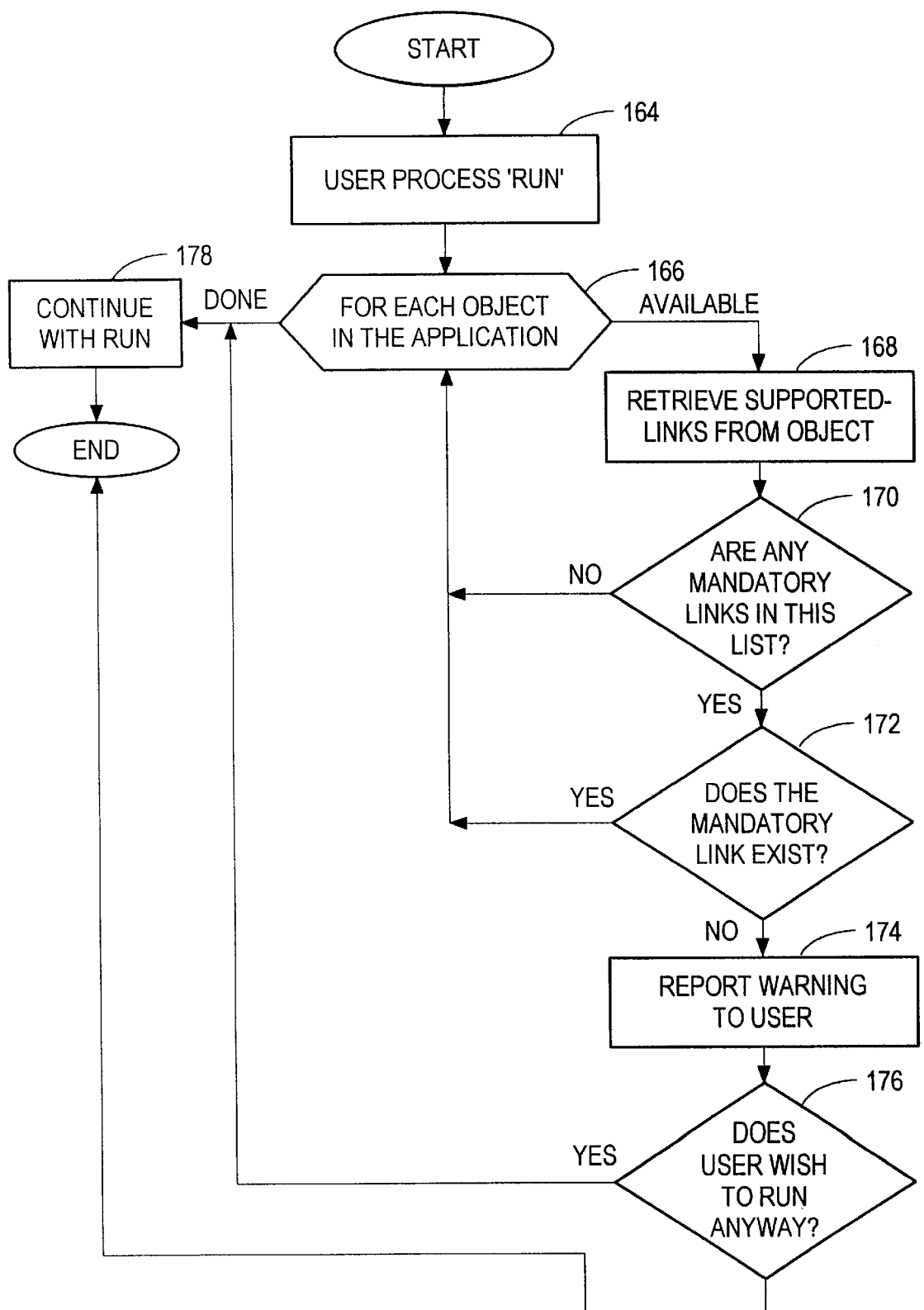

The method employed by the Run Advisor is illustrated in FIG. 9. The Run Advisor is executed when the developer tests a smart object containing application from within the user interface builder, i.e., whenever the user presses 'Run' 164 from the user interface builder. Starting with step 166, the list of Supported-Links is then examined for any mandatory links which are not filled, and if any are found then the developer can cancel the test. That is, each object is queried 168 for the list of Supported-Links that the object should support. If any mandatory links are found 170 in this list, then the object is checked 172 to verify that the link actually exists. In particular, some other object must be linked to the object with this link type. If the link does not exist, a warning is reported 174 to the developer, and the developer is given the opportunity 176 to RUN 178 in spite of the determination.

In one embodiment of the present invention the list of mandatory links is hard-coded into the development environment as: Navigation-Source, Record-Target, TableIO-Source, and Page-Source. In an alternative embodiment the list is included as an attribute of each object. That is, objects are queried for their list of 'Mandatory-Links.' The development environment thus allows efficient connecting of objects by providing the ability to create design-time instances of predefined and custom objects, the ability to query objects to determine their supported links, and a dialog to help developers assign these links. Further this dialog allows the user to select links from a list, or create new ones.

It should be understood that various changes and modifications may be made from the embodiment herein disclosed. Accordingly, the invention is not to be viewed as limited except by the scope and spirit of the appended claims.

What is claimed:

1. A method for connecting objects with an interactive software development environment comprising the steps of:

creating at least one design-time instance of an object;

querying the at least one object for links supported by the at least one object;

providing a dialog to assist developers to assign links by allowing the user to select links from a list and to create new links;

assuming that, where a record link is present, the record link must be supported by both source and target objects; and determining that either
  a) matching database tables exist in both objects, or
  b) that the record-source can provide some identification for the record-target, before the link is acceptable.

2. An interactive software development environment for development of an object oriented application with selected structure comprising:

a plurality of objects of at least first and second types, said objects containing a body of source code common to each of said objects;

a plurality of links of at least first and second types, said links operative to interconnect said objects;

an advisor capable of querying said objects for lists of desired links to support and which can provide suggestions as to links to make; and an advisor operative to provide a notice of detected logical errors in the structure of the application, error detection being based upon interconnection of said objects and said links, said advisor providing notice of any detected missing link prior to testing said application.

3. A method for creating a database management application with a user interface builder comprising the steps of:

creating at least one instance of an object;

checking that each object is valid;

querying each object to determine how the object should be linked to other objects;

allowing each object to determine how the attributes of that object should be initialized;

automatically creating an underlying structure to recreate the object and operational behavior of the object prior to compiling; connecting a link to the object;

choosing a link source and a link target;

querying the object to be connected for a list of supported links;

merging the list of supported links with a predefined list; and matching, where the object is being connected to a second object with a list of supported links, the list of links supported by the object with the list of links supported by the second object.

4. The method of claim 3 including the further step of obtaining the name of the master file of the object.

5. The method of claim 4 including the further step of running the object.

6. The method of claim 5 including the further step of determining whether an error occurred during said running step.

7. The method of claim 6 including the further step of determining whether the object is correctly configured.

8. The method of claim 7 including the further step of providing a list of attributes to the object.

9. An object-oriented programming environment for creation of database management applications with a plurality of predefined objects comprising:

a navigation object which provides navigational messages;

a tableIO object which provides record-manipulation messages;

a paging object which provides visualization of unique pages of objects;

a query object which provides database records;

a viewer object which facilitates presentation of data fields and forms;

a browser object which facilitates presentation of tabular data in rows and columns; and a container object capable of containing other said navigation, tableIO, paging, query, viewer and browser objects, wherein said predefined objects each include the capability to initialize and destroy themselves.

10. The programming environment of claim 9 wherein said predefined objects communicate and exchange data using a plurality of predefined links.

11. The programming environment of claim 10 wherein said predefined links include a record link which facilitates exchange of record pointers.

12. The programming environment of claim 11 wherein said predefined links further include a navigation link which facilitates exchange of record positioning messages.

13. The programming environment of claim 12 wherein said predefined links further include a tableIO link which facilitates exchange of record manipulation messages.

14. The programming environment of claim 13 wherein said predefined links further include a state link which facilitates transmission of object state information.

15. The programming environment of claim 14 wherein said predefined links further include a group-assign link which synchronizes messages from among multiple related objects.

16. The programming environment of claim 15 wherein said predefined links further include a container link which facilitates exchange of object containment messages.

17. The programming environment of claim 15 wherein said predefined links further include a page link which manages a plurality of visual pages within a user interface.

18. The programming environment of claim 9 wherein said predefined objects each include the capability to get and set attributes.

19. The programming environment of claim 9 wherein said predefined objects each include the capability to add and remove predefined links.

20. The programming environment of claim 9 wherein said predefined objects each include the capability to communicate using a standard communication interface.

* * * * *